US011905151B2

(12) United States Patent
Budd

(10) Patent No.: US 11,905,151 B2
(45) Date of Patent: Feb. 20, 2024

(54) SERVICE LIFT FOR UTILITY VEHICLES

(71) Applicant: Keith A. Budd, Jackson, MI (US)

(72) Inventor: Keith A. Budd, Jackson, MI (US)

( * ) Notice: Subject to any disclaimer, the term of this patent is extended or adjusted under 35 U.S.C. 154(b) by 0 days.

(21) Appl. No.: 17/950,639

(22) Filed: Sep. 22, 2022

(65) Prior Publication Data

US 2023/0091039 A1 Mar. 23, 2023

Related U.S. Application Data

(60) Provisional application No. 63/247,538, filed on Sep. 23, 2021.

(51) Int. Cl.

| | |
|---|---|
| ***B66F 7/18*** | (2006.01) |
| ***B66F 7/28*** | (2006.01) |
| ***B66C 23/48*** | (2006.01) |

(52) U.S. Cl.

CPC ................ *B66F 7/18* (2013.01); *B66C 23/48* (2013.01); *B66F 7/28* (2013.01)

(58) Field of Classification Search

CPC .. B66F 7/18; B66F 7/28; B66F 7/0616; B66F 7/02; B66F 7/04; B66C 23/48

See application file for complete search history.

(56) References Cited

U.S. PATENT DOCUMENTS 3,582,043 A * 6/1971 Tranchero ................ B66F 7/04 254/2 R 4,123,038 A * 10/1978 Meyers .................. B66F 19/00 414/427

4,363,409 A * 12/1982 Laurich-Trost .......... B63H 1/28 414/547

(Continued)

FOREIGN PATENT DOCUMENTS

DE 202011108916 U1 1/2012

OTHER PUBLICATIONS

Grainger: Lift Boom : 42 in ×7 in ×14 ¾ in, Steel, Blue, https://www.grainger.com/product/4YZ72, 1 page.

(Continued)

*Primary Examiner* — Michael R Mansen
*Assistant Examiner* — Michelle M Lantrip
(74) *Attorney, Agent, or Firm* — Endurance Law Group PLC

(57) ABSTRACT

A configurable service lift for servicing a utility vehicle in a cantilevered elevated condition. A carriage is carried on a vertical mast for travel between its lower and upper ends. The carriage independently supports the inboard and the outboard ends of the utility vehicle using at least one inboard platform and at least one outboard attachment carried on a boom. The inboard platform attached to the carriage and supports the inboard end of the utility vehicle. The boom extends longitudinally rearwardly to a distal lifting end upon with the outboard attachment is secured. The distal lifting end is moveable relative to the carriage in three directions—vertically, longitudinally and laterally. Retractable outrigger legs can be added for stability. The service lift can be a stationary fixture or configured with a towing package for mobile use. Optional tool holding accessories and an integrated waste oil receptacle are possible.

10 Claims, 9 Drawing Sheets

(56) References Cited

U.S. PATENT DOCUMENTS

| | | | | | |
|---|---|---|---|---|---|
| 4,548,387 | A * | 10/1985 | Saccoccia | B66F 7/08 | 254/10 B |
| 4,818,172 | A * | 4/1989 | Johnson | B66C 23/80 | 414/547 |
| 4,846,451 | A * | 7/1989 | Squier | B25H 1/0007 | 269/17 |
| 4,984,657 | A * | 1/1991 | Burns | B66F 7/025 | 187/217 |
| 5,051,056 | A * | 9/1991 | Gibbons | B66C 23/48 | 269/68 |
| 5,236,065 | A * | 8/1993 | Isogai | B60S 13/00 | 187/219 |
| 5,269,501 | A * | 12/1993 | Liegel | B66F 9/06 | 212/292 |
| 5,330,315 | A | 7/1994 | Beattie et al. | | |
| 5,338,015 | A * | 8/1994 | Liegel | B66F 9/18 | 254/134 |
| 5,339,926 | A * | 8/1994 | McCanse | B66F 7/04 | 187/219 |
| 5,358,217 | A * | 10/1994 | Dach | B66F 3/00 | 254/134 |
| 5,375,963 | A * | 12/1994 | Wohlwend | B66C 23/48 | 212/203 |
| 5,632,475 | A | 5/1997 | McCanse | | |
| 5,915,742 | A * | 6/1999 | Hung | B62D 65/00 | 29/281.5 |
| 6,116,577 | A | 9/2000 | McCanse | | |
| 6,371,449 | B1 | 4/2002 | Chamberlain | | |
| 6,485,001 | B1 * | 11/2002 | Mallery | B66C 23/48 | 254/4 B |
| 6,490,906 | B1 * | 12/2002 | Bailey | B25H 1/0007 | 72/457 |
| 6,705,821 | B2 | 3/2004 | Philipps et al. | | |
| 6,821,075 | B2 | 11/2004 | van der Horn | | |
| 6,830,272 | B1 * | 12/2004 | Bailey | B66C 23/48 | 414/812 |
| 7,207,419 | B2 | 4/2007 | Fore et al. | | |
| 7,225,900 | B2 | 6/2007 | Fox | | |
| 7,311,297 | B1 * | 12/2007 | Bradshaw | B66D 3/18 | 254/326 |
| 8,636,112 | B2 | 1/2014 | Burchfield et al. | | |
| 9,162,856 | B2 | 10/2015 | Elliott et al. | | |
| 9,637,362 | B2 | 5/2017 | Zhang | | |
| 10,710,852 | B2 | 7/2020 | Ferrone | | |
| 2004/0247423 | A1 | 12/2004 | Thiel et al. | | |
| 2016/0137468 | A1 * | 5/2016 | Walker | B66F 9/142 | 187/235 |
| 2022/0144608 | A1 * | 5/2022 | Tetreau | B66F 7/26 | |

OTHER PUBLICATIONS

Redline Stands: Hoffman Mini Lift For Cars and Light Duty Trucks, https://www.redlinestands.com/catalog/lifts-c-290/automotive-lifts-c-290_138/single-post-lifts-c-290_138_198/hoffman-mini-lift-for-cars-and-light-duty-trucks-p-730, 5 pages.

* cited by examiner

SERVICE LIFT FOR UTILITY VEHICLES

CROSS REFERENCE TO RELATED APPLICATIONS

This application claims priority to Provisional Patent Application Ser. No. 63/247,538 filed Sep. 23, 2021, the entire disclosure of which is hereby incorporated by reference and relied upon.

BACKGROUND OF THE INVENTION

Field of the Invention

The invention relates generally to service lifts, and more particularly, to lifts for utility vehicles and recreational vehicles, including but not limited to riding mowers, light-duty tractors, garden tractors, golf carts, ATV's, snowmobiles, motorcycles, and the like.

Description of Related Art

Utility vehicles and recreational vehicles require frequent inspection and maintenance. For such operations, these vehicles are preferably lifted to a level that allows the service technician to comfortably access to the underside of the vehicle.

Examples of prior art lifts for servicing purposes can be found in U.S. Pat. Nos. 5,632,475, 6,116,577, 7,207,419, 8,636,112 and U.S. Ser. No. 10/710,852. From consideration of these examples, three common major shortcomings can be observed: 1) restricted access to the underside of a lifted vehicle; and/or 2) that the vehicle being serviced must be loaded into the lift from its side; and/or that the lift is not conveniently reconfigurable. In addition to these major shortcomings, there are also a host of minor shortcomings.

Taking each of these major shortcomings in turn, the problem of restricted access is caused by the lifting forks, trays or tongues. That is to say, the elements of the lift used to make contact with the vehicle (typically its tires or frame) underlie significant portions of the vehicle. As a result, many operations are at best frustrated and at worst unachievable. For example, removing the mowing deck of a wide, commercial mower is often impossible using prior art lifts. A service technician is often required to perform partial services on a vehicle, then lower the vehicle, turn it around, and re-lift from its other side to complete the repairs. This can be time-consuming and burdensome, especially in cases where the partially serviced vehicle is not in condition for rolling. There is therefore a need in the art to provide a service lift that enables greater access to the undercarriage of a utility/recreational vehicle.

The problem of the loading a vehicle into the lift from its side is largely a practical issue. Most if not all utility vehicles and recreational vehicles are incapable of sideways (transverse) movement. This means that the vehicle must be driven or rolled into position to be lifted from its side. The side-loading requirement of many prior art service lifts means that in the typical wall-mounted application, additional clearance space must be provided along the wall directly adjacent the service lift for vehicle loading and unloading. This dedicated loading and unloading space robs the service shop of fully utilizing its floor space. Furthermore, a vehicle loaded from its side obscures, typically, one whole inboard side from service work. Only the outboard side of the vehicle can be easily accessed for maintenance and repair. There is therefore a need in the art to provide a service lift that enables a utility/recreational vehicle to be front-end or rear-end loaded into the service lift.

The problem of portability for most prior art service lifts means that the customer must transport their utility/recreational vehicle to the lift for maintenance. In most cases, the utility/recreational vehicle must be trailered to a professional service shop. For commercial enterprises that operate a fleet of utility/recreation vehicle, e.g., lawncare service providers, this may entail numerous sequential trips to the shop and compounded lost revenue. Many customers would value a service call from a repair technician to avoid the burden of transporting the vehicle to the repair shop.

A partial solution to many of these shortcomings may be found in the German Gebrauchsmusterschrift DE202011108916 to Dagn, issued Mar. 15, 2012. DE202011108916 discloses a vertical lifting column 1 that carries a wheel mount 6 and a boom-like carrier 3. The front wheel of a motorcycle is captured in the wheel mount 6. A suspension device 4, 5 is moveable along the length of the carrier 3 for the purpose of suspending the rear end of the motorcycle. The motorcycle can then be raised along the lifting column 1 into the working position, with the wheel mount 6 and the carrier 3 being moved synchronously along the lifting column 1.

Although the lifting device of DE202011108916 addresses many of the shortcomings noted earlier, it is nevertheless highly constricted in its ability to accommodate vehicle types other than motorcycles. There is therefore a need in the art for an easily configurable service lift that can accommodate a wide range of utility vehicle types.

BRIEF SUMMARY OF THE INVENTION

According to a first aspect of this invention, a configurable service lift is provided for elevating a utility vehicle in a cantilevered condition for repair and maintenance. The configurable service lift comprises a frame. A mast is supported in the frame and extends vertically from a lower end to an upper end. The mast defines a forward longitudinal direction and a rearward longitudinal direction and a first lateral direction and a second lateral direction. A carriage carried on the mast for travel between its lower and upper ends. A vertical actuator is operatively disposed between the carriage and the mast. The carriage is configured to independently support the inboard and the outboard ends of the utility vehicle using at least one inboard platform and at least one outboard attachment. The inboard platform is attached to the carriage for supporting the inboard end of the utility vehicle. At least one boom is attached to, and extends longitudinally rearwardly from, the carriage to a distal lifting end. The distal lifting end is disposed at an elevation above the inboard platform. At least one outboard attachment is suspended from the distal lifting end to engage the outboard end of the utility vehicle. The distal lifting end is moveable relative to the carriage in at least two directions.

According to a second aspect of this invention, a configurable service lift is provided for elevating a utility vehicle in a cantilevered condition for repair and maintenance. The configurable service lift comprises a frame. A mast is supported in the frame and extends vertically from a lower end to an upper end. The mast defines a forward longitudinal direction and a rearward longitudinal direction and a first lateral direction and a second lateral direction. A carriage is carried on the mast for travel between its lower and upper ends. A vertical actuator is operatively disposed between the carriage and the mast. The carriage is configured to independently support the inboard and the outboard ends of the utility vehicle using at least one inboard platform and at least two outboard attachments. The inboard platform attached to the carriage for supporting the inboard end of the utility vehicle. The carriage includes first and second booms. Each the first and second booms extend longitudinally rearwardly to a respective first and second distal lifting end. The first distal lifting end is moveable relative to the carriage in at least two directions, and similarly the second distal lifting end is also moveable relative to the carriage in at least two directions.

Enabling movement in at least two directions of the distal lifting end of the boom (or booms) has many advantages. These include the ability to accommodate a wider range of types of utility vehicles, potentially greater access to the underside of the utility vehicle, as well as a greater degree of personal safety in cases where angular orientation is deemed especially relevant.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1:
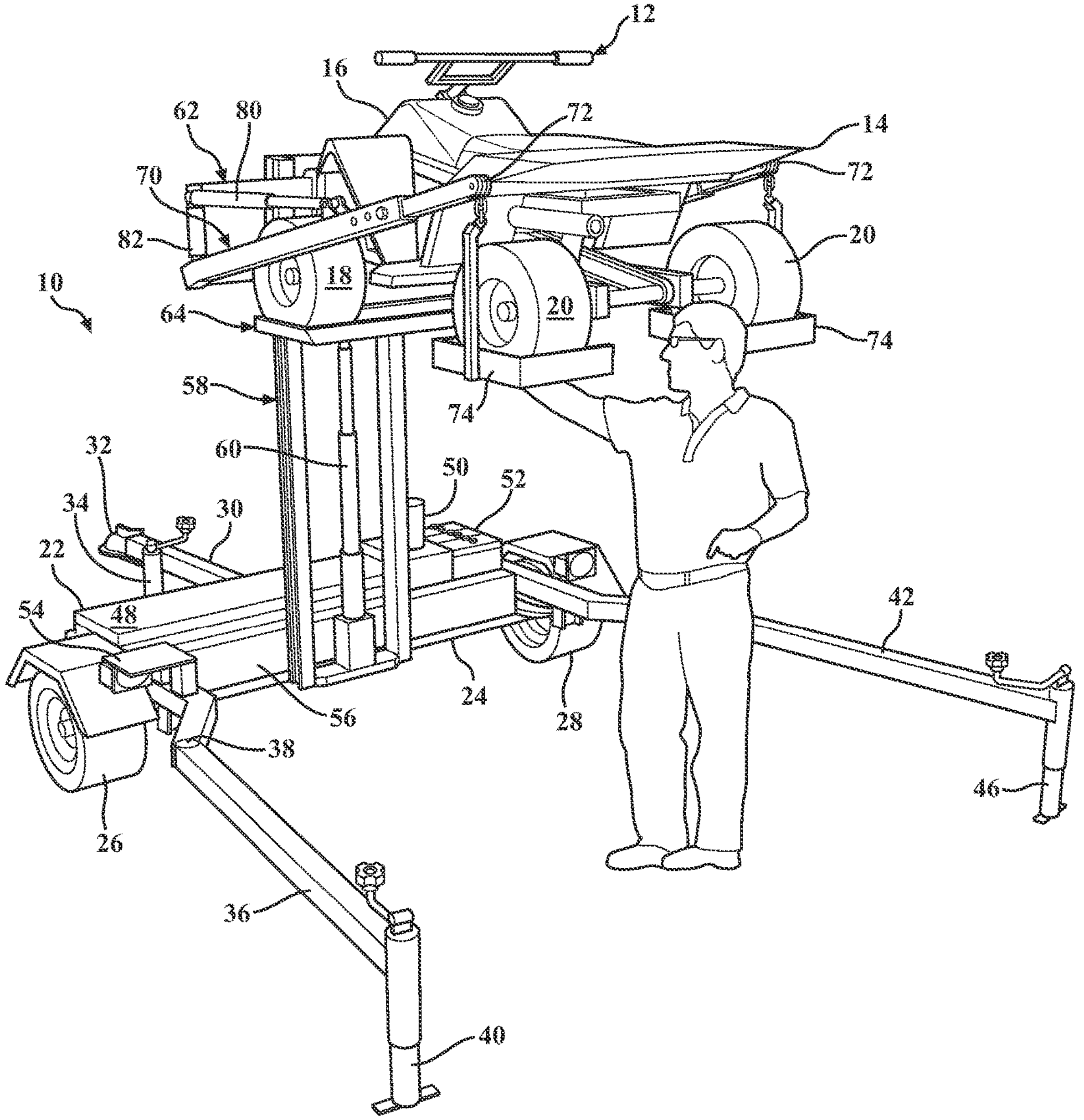
FIG. 1 is a perspective view of the invention according to a first exemplary embodiment in which a utility vehicle is elevated in a cantilevered condition for repair and/or maintenance.

Referring to the figures, wherein like numerals indicate like or corresponding parts throughout the several views, a configurable service lift according to a first exemplary embodiment of the invention is generally shown at 10 in FIGS. 1-5. The configurable service lift according to a second exemplary embodiment of the invention is generally shown at 10' in FIGS. 6-9.

In all variations, the configurable service lift 10, 10' functions to elevate a wide variety of types of utility vehicles 12 in a cantilevered condition for repair and maintenance. Without limitation, some of the contemplated types of utility vehicles 12 include wheeled motorized off-highway vehicles of all sorts, such as all-terrain vehicles (ATVs), utility-terrain vehicles (UTVs), lawn tractors, zero-turn lawn mowers, small agricultural tractors, and golf carts to name a few. Utility vehicles 12 suitable for elevating with the service lift 10, 10' include some wheeled motorized on-highway vehicles, such as two-wheeled and three-wheeled motorcycles. Utility vehicles 12 suitable for elevating with the service lift 10, 10' may also include some non-wheeled motorized vehicles, such as snowmobiles.

Regardless of the type, each utility vehicle 12 can be seen to have an outboard end 14 and an inboard end 16 when presented to the service lift 10, 10'. That is to say, the terms "outboard" and "inboard" are relative to the configurable service lift 10, 10'. The inboard end 16 of the utility vehicle 12 is that end in closest proximity to the service lift 10, 10'. And thus conversely, outboard end 14 of the utility vehicle 12 is that end in most distant to the service lift 10, 10'. In situations where the utility vehicle 12 is presented to the service lift 10, 10' in a forward pointing orientation, the nose or natural front end of the vehicle 12 will be the inboard end 16. However, in situations where the utility vehicle 12 is backed up to the service lift 10, 10', the tail or natural rear end of the vehicle 12 will be the inboard end 16.

In the illustrated examples, the utility vehicle 12 is depicted as being representative of a wheeled off-highway type, having four wheels—two wheels 18 located adjacent the inboard end 16 and two wheels 20 located adjacent the outboard end 14. It will be understood, however, that the service lift 10, 10' can be used to elevate a utility vehicle 12 having only one wheel 18 at the inboard end 16 and/or one wheel 20 at the outboard end 14. Moreover, although the illustrated examples do not depict the utility vehicle 12 having a rollbar or other type of Rollover Protective Structure (ROPS), the service lift 10, 10' can be used to elevate a utility vehicle 12 having a rollbar/ROPS. Similarly, although the illustrated examples do not depict the utility vehicle 12 having a roof as is the case with many UTVs and golf carts, the service lift 10, 10' can be used to elevate a utility vehicle 12 having a roof. In other words, the service lift 10, 10' is able to accommodate utility vehicles 12 with or without a ROPS as well as with or without a roof.

Referring now specifically to FIGS. 1-5, the configurable service lift 10 includes a frame 22. The frame 22 comprises the supporting structure of the service lift 10 that enables stable use when elevating a utility vehicle 12. That is to say, the frame 22 is the portion of the service lift 10 that makes contact with the ground. The frame 22 can take many different configurations and be fitted with any number of optional features.

In the illustrated examples, the frame 22 is fitted with an optional towing package to facilitate easy transportation (FIG. 8) and storage when not in use. The towing package includes an axel 24 supported in the frame 22. The axel 24 has laterally spaced apart ends. A first wheel 26 is rotatably attached to one end of the axel 24, and a second wheel 28 is rotatably attached to the other end. To comply with over-the-road regulations, it may be necessary to attach a first fender to the frame 22 so that it overlays the first wheel 26. And likewise, a second fender can be attached to the frame 22 and overlay the second wheel 28. Similarly, signal/running lights and a license plate can also be supported on the frame 22. A rigid tongue 30 extends longitudinally forwardly from the frame 22 toward a distal leading end to which a hitch coupling 32 is disposed. The towing package may optionally include a primary leveling jack 34 secured to the tongue 30 adjacent the hitch coupling 32.

The frame 22 may be fitted with optional outrigger features to improve stability in use when elevating a utility vehicle 12. Outriggers, also known as stabilizers, are retractable or foldable or detachable legs that can be selectively deployed to extend away from the frame 22 before they make contact with the ground. The purpose of an outrigger is to provide a solid, stable base by distributing the load over a wider area. It is generally contemplated that unless the frame 22 is structurally mounted to the floor or secured to a wall or other very stable structure, the frame 22 will need to be fitted with outrigger features of some kind that provide adequate outward support for tip-over prevention, possibly in combination with some type of mechanical or hydraulic or pneumatic leveling system.

In the illustrated examples, a first outrigger leg 36 is rearwardly extendable relative to the frame 22. The first outrigger leg 36 is pivotally attached to the frame 22 adjacent the first wheel 26 at a first hinge 38. The first outrigger leg 36 has an outer swinging end that is moveable in an arcuate path between a stowed position folded adjacent the second wheel 28 and a deployed position extending rearwardly from the frame 22. In FIGS. 1-5, the first outrigger leg 36 is shown only in the deployed position. However, comparison to FIG. 7 will inform the person of ordinary skill in the art how the outer swinging end of the first outrigger leg 36 is moved in an arcuate path toward a stowed position folded adjacent the second wheel 28. A first auxiliary leveling jack 40 is carried on the outer swinging end of the first outrigger leg 36. In customary hand-crank fashion, the first auxiliary leveling jack 40 is extended to make contact with the underlying ground surface when the first outrigger leg 36 is in the deployed position.

Figure 7:
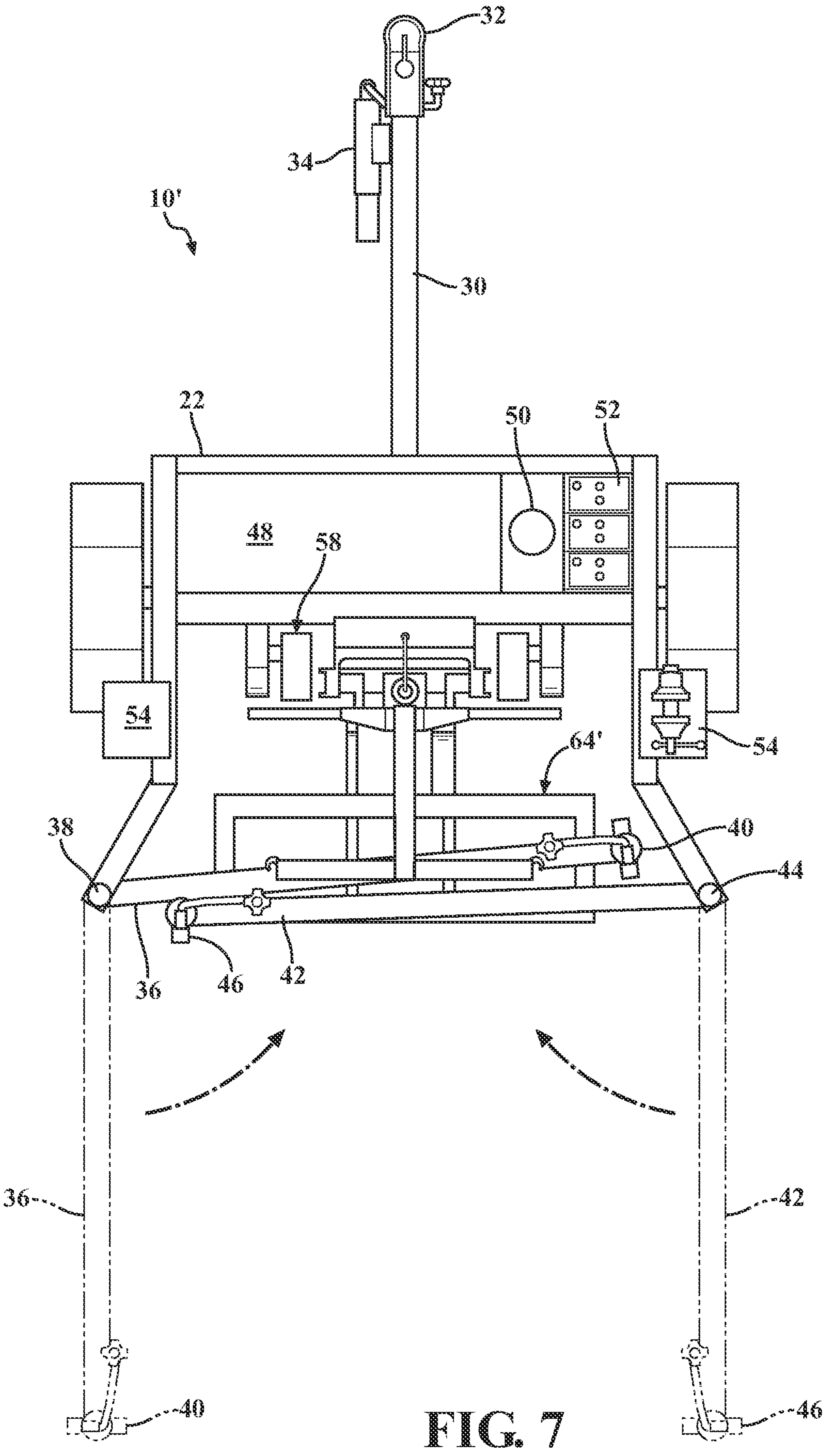
FIG. 7 is a top view of the second exemplary embodiment illustrating the first and second outrigger legs swung in an arcuate path toward a stowed position.
Figure 8:
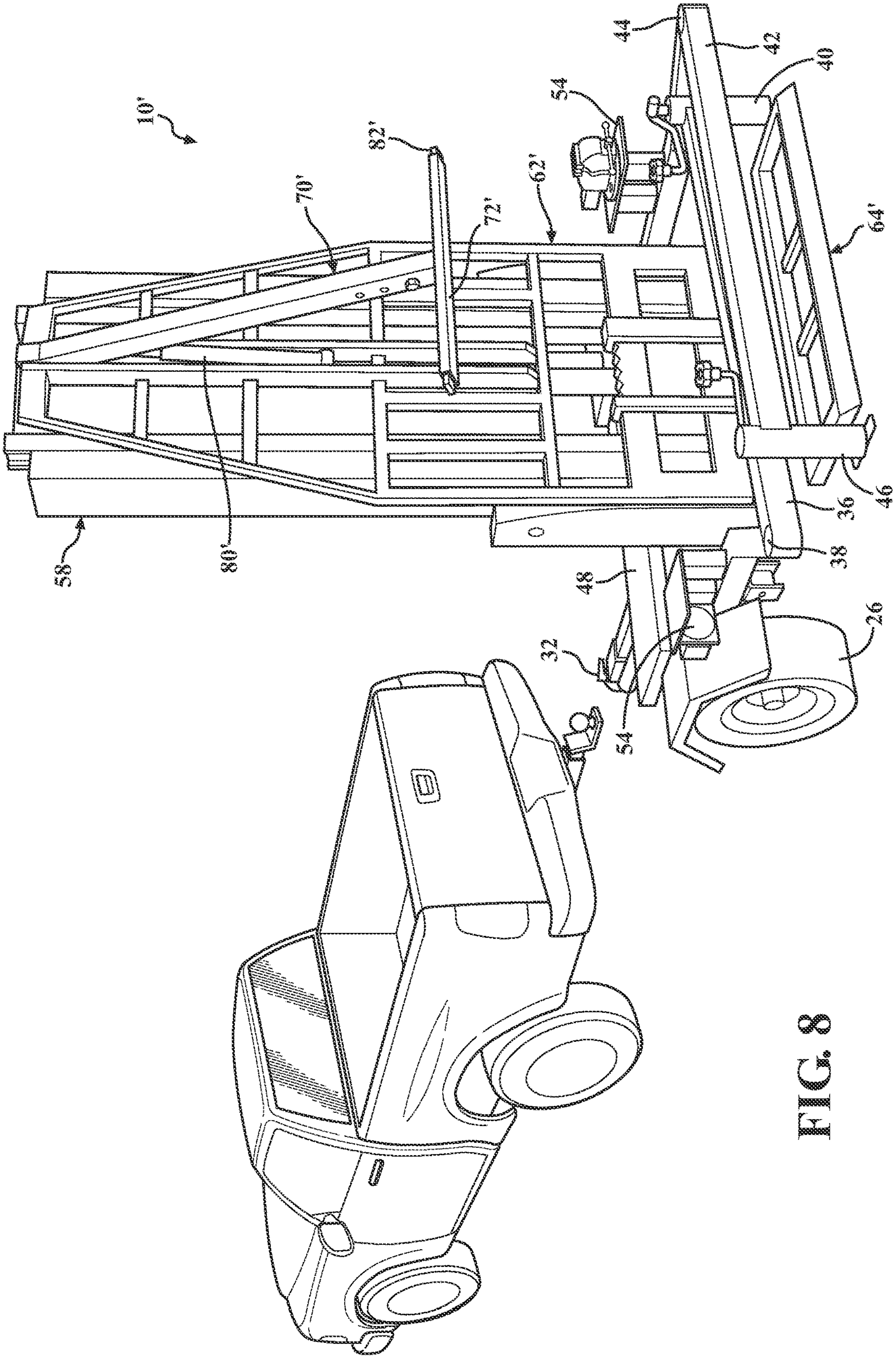
FIG. 8 is a perspective view of the second exemplary embodiment prepared for transport.

Similarly, a second outrigger leg 42 is rearwardly extendable relative to the frame 22. The second outrigger leg 42 is pivotally attached to the frame 22 adjacent the second wheel 28 at a second hinge 44. The second outrigger leg 42 has an outer swinging end that is moveable in an arcuate path between a stowed position folded adjacent the first wheel 26 and a deployed position extending rearwardly from the frame 22. As with the first outrigger leg 36, in FIGS. 1-5 the second outrigger leg 42 is shown only in the deployed position. Reference to FIG. 7 will explain how the outer swinging end of the second outrigger leg 42 is moved in an arcuate path toward a stowed position. A second auxiliary leveling jack 46 is carried on the outer swinging end of the second outrigger leg 42, which is extended to make contact with the underlying ground surface in the deployed position.

Other optional frame 22 features may include a toolbox 48 used to store tools needed to preform anticipated service work on a utility vehicle 12. In one contemplated configuration, the toolbox 48 is supported in the frame 22 over or in close proximity to the axel 24. The toolbox 48 could either be permanently mounted in the frame 22, such as for security purposes, or made to be removeable.

Still further optional features carried on or in the frame 22 can include utility items such as a hydraulic fluid pump 50, a battery 52, a power inverter, compressor, and the like. These are offered as examples of the many different types of functional objects and tools that can be accommodated in the frame 22. Moreover, the frame can be configured with one or more tool pads 54. A single tool pad 54 is shown in the example of FIGS. 1-5, whereas two tool pads 54 are illustrated in the example of FIGS. 6-9. The tool pad 54 can be used to mount an object that would normally be attached to a workbench or cart in use. In FIGS. 6-9 the example is given as screw vise, however it is also contemplated that the tool pad 54 could be used to support an electric bench grinder or any other suitable object. The aforementioned possibility to support a power inverter in the frame 22 could then be used to supply an electric motor driven item such as a bench grinder.

It is also contemplated that the frame 22 could be modified to support a waste oil receptacle 56. The waste oil receptacle 56 could either be permanently mounted in the frame 22 or made to be removeable. In the case of the former, the waste oil receptable could be integrated into a hollow structural member of the frame 22 and fitted with an easily accessible inlet and drain. The motivation to outfit the frame 22 with a waste oil receptacle 56 would be to facilitate oil changes for the utility vehicle 12, especially when carried out in the field as part of a mobile service operation.

Thus, it will be appreciated from this sampling of descriptions that the frame 22 can take many different configurations and be fitted with any number of optional features.

Figure 2:
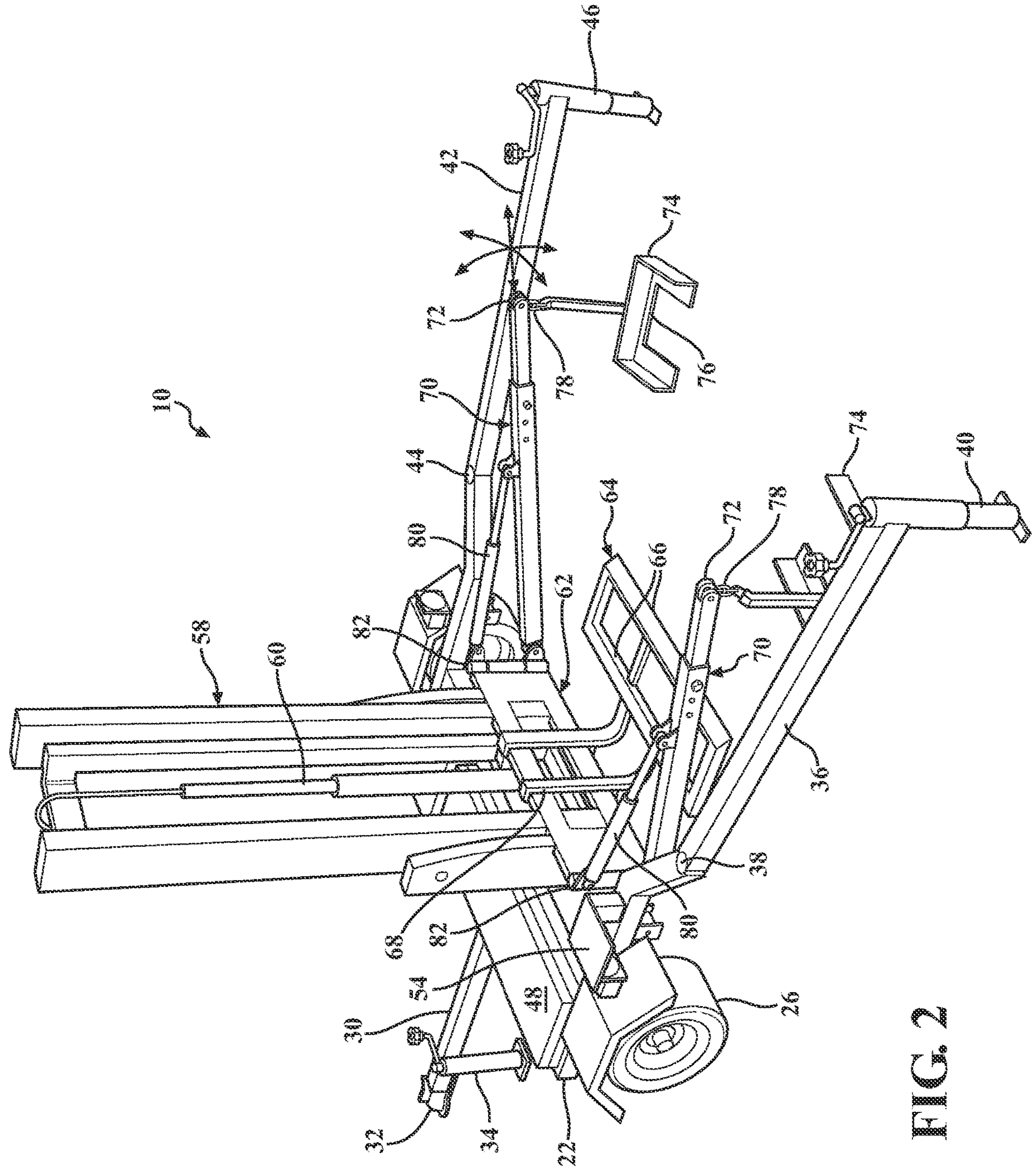
FIG. 2 is a perspective view of the first exemplary embodiment but showing the carriage lowered and the first and second booms spread apart in preparation to receive a utility vehicle for service.

The configurable service lift 10 includes a mast 58 supported in the frame 22. The mast 58 extends vertically from a lower end to an upper end, as can be seen in FIGS. 1 and 2. The mast 58 defines a forward longitudinal direction and a rearward longitudinal direction and a first lateral direction and a second lateral direction. The forward longitudinal direction is toward the tongue 30. That is to say, the tongue 30 can be said to extend away from the mast 56 in the forward longitudinal direction. The rearward longitudinal direction is away from the tongue 30. The first lateral direction is toward the first wheel 26, and the second lateral direction in toward the second wheel 28. Although it is expected that vertical of the mast 58 will generally coincide with a vertical vector established by the gravitational pull of the earth, it would not be outside the spirit of this invention were the mast 58 to have a slight cant or tilt particularly in the forward longitudinal direction. These directional attributes will be useful in describing the further elements of the service lift 10.

The mast 58 is preferably, although not necessarily, anchored to the frame 22 adjacent the axel 24, generally midway between the first 26 and second 28 wheels. In particular, the mast 58 may be located either directly above or on the rearward longitudinal side of the axel 24 so as to avoid interference. The mast 58 can take many different shapes and forms, including as a single tube or I-beam. However, in the illustrated examples the mast 58 comprises a pair of rigid uprights arranged parallel to one another, as may be found commonly in forklift applications. Utilizing a pair of rigid uprights arranged in this manner provides the mast 58 with stability and resistance to twisting. In some contemplated embodiments, the mast 58 may be telescopic and/or have multiple sections to enable either a shorter height for convenient transport or increased lifting height. Likewise, it is contemplated that the mast 58 could also be hinged or otherwise shiftable between a collapsed transport condition and an upright service condition.

The mast 58 includes a vertical actuator 60. The vertical actuator 60 can be selected from a wide-ranging group of mechanism types well-suited to the job. Although the illustrated examples depict the vertical actuator 60 in the form of a hydraulic cylinder, alternatives are contemplated. For example, the vertical actuator could be configured as a screw jack, as a pneumatic cylinder or bladder, as a winch with cables, and so forth. Indeed, there is no attempt to make any limitation on the type of mechanism. The vertical actuator 60 can be disposed in any convenient location, considering the type of mechanism used. In the example of the mast 58 configured as a pair of uprights and the vertical actuator 60 as a hydraulic cylinder, it is convenient to locate the vertical actuator 60 in-between the uprights. The previously mentioned inclusion of a fluid pump 50 carried on the frame 22 would serve to feed hydraulic fluid on demand to the hydraulic cylinder.

The configurable service lift 10 includes a carriage, generally indicated at 62, carried on the mast 58. The carriage 62 is configured for captured travel between the lower and upper ends of the mast 58. That is to say, the carriage 62 may be likened to a shuttle that moves up and down along the mast 58. The vertical actuator 60 is operatively connected to the carriage 62 and provides the motive impulse to raise the carriage 62 in the vertical direction. In most circumstances, gravity will provide the motive force to lower the carriage 62 in the vertical direction. The carriage 62 is designed to slide with low friction along the mast 58. This can be accomplished with rollers operatively engaging the mast 58, or a suitably designed sliding interface.

An objective of the carriage 62 is to independently support the inboard 16 and the outboard 14 ends of the utility vehicle 12. As will be explained below, by individually supporting the inboard 16 and the outboard 14 ends of the utility vehicle 12, a wider range of types of utility vehicles 12 can be accommodated. And moreover, by separately supporting the inboard 16 and the outboard 14 ends of the utility vehicle 12, the operator is afforded greater access to the underside of the utility vehicle 12 for purposes of convenient service repairs. And finally, by independently supporting the inboard 16 and the outboard 14 ends of the utility vehicle 12, a greater degree of personal safety can be expected. Toward this latter point, a safety catch (not shown) may be installed between the lower and upper ends of the mast 58. The safety catch can be a simple mechanical latch that is gravity actuated by the rising carriage 62, but that will automatically arrest descent of the carriage 62 until manually deactivated. In this manner, an operator can assure themselves that no person or animal or other object of concern is below a utility vehicle 12 intending to be lowered.

As stated, for a number of reasons the carriage 62 is configured to separately support each of the inboard 16 and the outboard 14 ends of the utility vehicle 12. To be more specific, at least one inboard platform, generally indicated at 64, is attached to the carriage 62 for supporting the inboard end of the utility vehicle 12. The inboard platform 64 can take many different shapes to execute a wide variety of support strategies. For example, when the utility vehicle 12 to be lifted is a snowmobile, the inboard platform 64 will be configured to accommodate either the front skis or the rear track, depending on whether the snowmobile is presented to the service lift 10 in a nose in or tail in orientation. In one common situation, however, the utility vehicle 12 is wheeled such that the inboard platform 64 is configured as a wheel tongue to suspend the inboard end 16 of the utility vehicle 12 proximate the mast 58. The wheel tongue can be formed with at least two laterally extending inboard wheel chocks 66 spaced-apart from one another. The inboard wheel or wheels 18 (which could be either associated with the front or rear of the utility vehicle 12 depending on how it is presented to the service lift 10), is safely cradled between these chocks 66.

For use with utility vehicles 12 having two inboard wheels 18 such as those depicted in FIGS. 1 and 3-5, the wheel tongue either can be a wide unitary structure that can accommodate both inboard wheels 18, or alternatively two separate wheel tongues that each accommodate a single inboard wheel 18. In either case, but especially in the latter case of two separate wheel tongues, the inboard platform 64 may be designed to accommodate laterally adjustment of the position of the wheel tongue relative to the carriage 62. For example, this could be accomplished with a hook feature 68 that extends from the wheel tongue and is moveably disposed relative to the carriage 62, similar to the laterally adjustable fork tines seen in some forklift trucks. Lateral adjustment of the inboard platform 64 can be used by the operator to accommodate a slightly maladjusted presentation of the utility vehicle 12 and/or a wider or narrower than expected spacing between the two inboard wheels 18.

To separately support the outboard 14 end of the utility vehicle 12, at least one boom, generally indicated at 70, is attached to and extends longitudinally rearwardly from the carriage 62 to a distal lifting end 72. That is, the distal lifting end 72 of the boom 70 is its most longitudinally-rearward tip. In the first exemplary embodiment of FIGS. 1-5, the carriage 62 is configured so as to utilize two distinct booms 70, which may be designated first and second booms 70 corresponding to respective proximity to the first 26 and second 28 wheels. The first boom 70 is the boom closest to the first wheel 26, and the second boom 70 is closest to the second wheel 28.

The accompanying illustrations portray the first and second booms 70 as being generally straight and extending linearly toward the respective distal lifting ends 72. It has been found expedient for many applications to inwardly angle the distal lifting ends 72 of each boom 70 rather than utilize the straight designs shown in the illustrations. More specifically, approximately six to twenty-four inches (~6-24") of the distal end of each boom 70 can be curved or angled so that its distal lifting end 72 projects toward the utility vehicle 12, resulting in a pincer-like appearance. Favorable results have been achieved when the distal twelve inches (12") of each first and second boom 70 is inwardly angled approximately forty-five degrees (~45°). Inwardly angled distal lifting ends 72 have been found to better accommodate certain utility vehicles 12, such as those having cabs, canopies and roofs—especially such styles having inset outboard wheels 20. Golf carts and UTVs would be common examples. And the pincer-like shape allows the booms 70 to remain clear from the sides of the utility vehicle 12 while being raised and lowered.

At least one outboard attachment 74 is suspended from the distal lifting end 72 of each boom 70. The outboard attachment 74 is configured to securely grasp or support the outboard end 14 of the utility vehicle 12 during elevation. The outboard attachment 74 will naturally take a wide variety of designs depending, at least in part, on the size and shape of the utility vehicle 12 to be elevated. In practice, the distal lifting end 72 will be disposed at an elevation above the inboard platform 64, as seen in FIG. 5. For example, when the utility vehicle 12 to be lifted has a roll bar/ROPS, the outboard attachment 74 could be configured to engage with that roll bar/ROPS. A simple hanging chain or strap could be sufficient in such instances. However, if the utility vehicle 12 to be lifted has a roof or Rollover Protective Structure (ROPS), the outboard attachment 74 may need to be configured so as to engage with the outboard wheels 20 as in the examples of FIGS. 1 and 3-5. These illustrations depict the outboard attachment 74 in the form of a wheel cuff 76 attached to a short length of hanging chain 78 or strap. The wheel cuffs 76 are designed with a laterally-inwardly facing U-shape to facilitate side-engagement of an outboard wheel 20 as can be appreciated from FIG. 4. Indeed, many variations are possible, including but not limited to a lifting horizontal wheel tray and a lifting bar. It is contemplated that the outboard attachment 74 will be designed to suit the intended application, and therefore could take a wide variety of configurations.

The distal lifting end 72 of each boom 70 is moveable relative to the carriage 62 in at least two directions—vertically and laterally. However, in the illustrated examples, the booms 70 are each moveable relative to the carriage 62 in three directions—vertically and laterally and longitudinally, as shown by the directional arrows in FIG. 2. Enabling movement of the distal lifting end 72 of each boom 70 has many advantages. These include the ability to accommodate a wider range of types of utility vehicles 12. In particular: vertical adjustment facilitates accommodation for tall and short utility vehicles; lateral adjustment facilitates accommodation for wide and narrow utility vehicles; and longitudinal adjustment facilitates accommodation for long and short utility vehicles. And moreover, vertical movement of the distal lifting end 72 of each boom 70 affords the operator greater access to the underside of the utility vehicle 12, as well as a greater degree of personal safety in cases where angular orientation is deemed especially relevant. Structural features enabling each direction of motion will be described in turn.

Vertical adjustment is accomplished by pivotally connecting each boom 70 to the carriage 62 for articulating movement in a generally vertical plane between lowered and raised positions. A boom actuator 80 is operatively disposed between each boom 70 and the carriage 62. Although the illustrated examples depict the boom actuator 80 in the form of a hydraulic cylinder, alternatives are contemplated. For example, the boom actuator 80 could be configured as a screw jack, as a pneumatic cylinder or bladder, as a winch with cables, and so forth. Indeed, there is no attempt to make any limitation on the type of mechanism used to raise the distal lifting ends 72 of each boom 70. The boom actuator 80 can be disposed in any convenient location, considering the type of mechanism used. In the hydraulic cylinder configuration shown in FIGS. 1, 2 and 5, the boom actuators 80 contract to raise the respective distal lifting ends 72 and conversely extend to lower the distal lifting ends 72. The previously mentioned inclusion of a fluid pump 50 carried on the frame 22 would serve to feed hydraulic fluid on demand to the hydraulic cylinders of the booms 70.

One particularly advantageous feature of the embodiment of FIGS. 1-5, which is distinguished by independent first and second booms 70 that are raised/lowered by respective boom actuators 80, is that the outboard end 14 of the utility vehicle 12 can be tipped so that one side is higher than the other. Some service operations can be facilitated by raising the distal lifting end 72 of one boom 70 higher than the distal lifting end 72 of the other boom 70. Not only does vertical movement of the distal lifting ends 72 relative to inboard platform 64 afford a service technician greater access to the underside of the utility vehicle 12, but complex angular adjustments are also possible by actuating the first and second booms 70 in a non-symmetrical manner. With one distal lifting end 72 higher than the other distal lifting end 72, all types of maintenance and repairs on a utility vehicle 12 can be accomplished with maximum convenience.

Lateral adjustment is accomplished by a lateral adjustor 82 configured to laterally shift the outboard attachment 74 relative to the inboard platform 64. In the example of FIGS. 1-5, the lateral adjustor 82 is configured as a hinged connection between each boom 70 and the carriage 62. In this manner, the lateral motion is arcuate, as perhaps best appreciated from the phantom position of the booms 70. Many alternative configurations for the lateral adjustor 82 are contemplated. At least two alternative designs for the lateral adjustor 82' are described below in connection with FIGS. 6-9.

Longitudinal adjustment is accomplished by configuring the distal lifting end 72 to be longitudinally extensible relative to the carriage 62. FIGS. 1-5 illustrate an example where the distal lifting end 72 is fashioned as a telescopic portion of the boom 70. Several fixed extension positions are suggested with a pin of some kind used to secure the telescopic sections at a desired length. In this manner, the longitudinal position of the distal lifting end 72 can be changed relative to the carriage 62. Many alternative design options are contemplated.

It is to be understood that the booms 70 can take any form suited to the application. Therefore, many design variations are possible. Moreover, the booms 70 can be made to fold back out of the way when not in use for a less restrictive work area in the general space occupied by the service lift 10.

Figure 3:
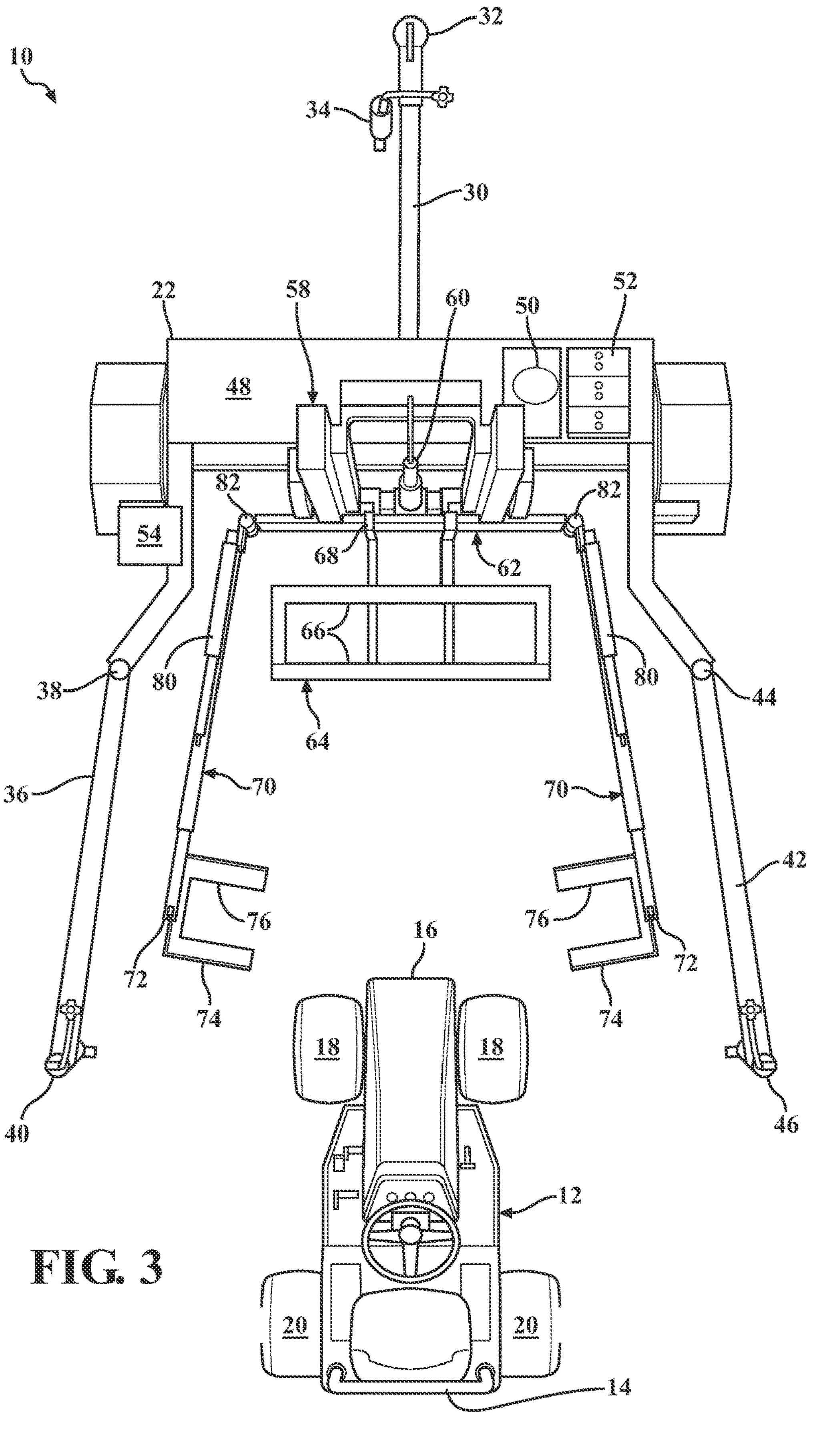
FIG. 3 is a top view of the first exemplary embodiment as in FIG. 2, together with an approaching utility vehicle.
Figure 4:
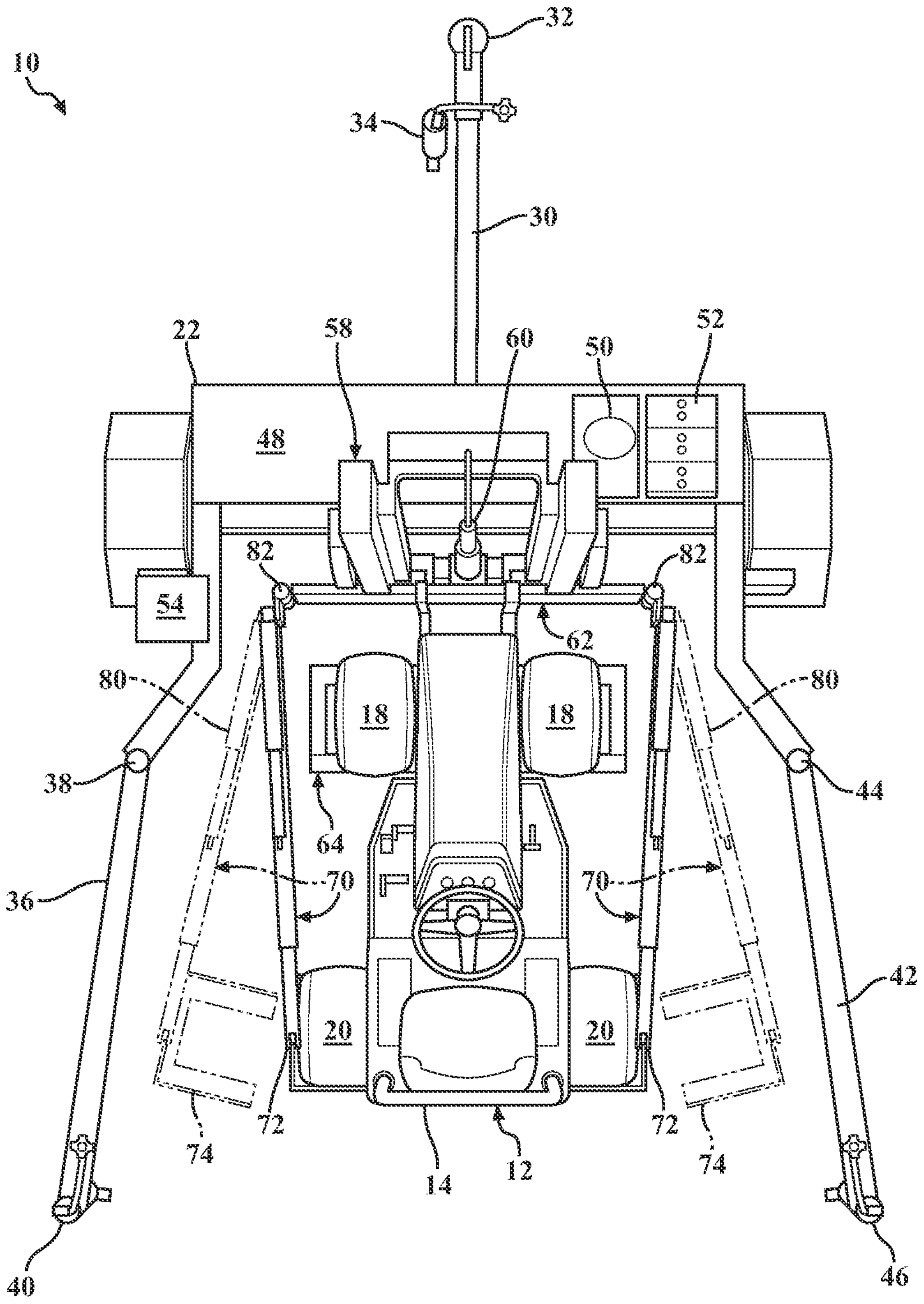
FIG. 4 is a view as in FIG. 3 showing the utility vehicle positioned for lifting and the first and second booms articulated into engagement with the outboard end of the utility vehicle.
Figure 5:
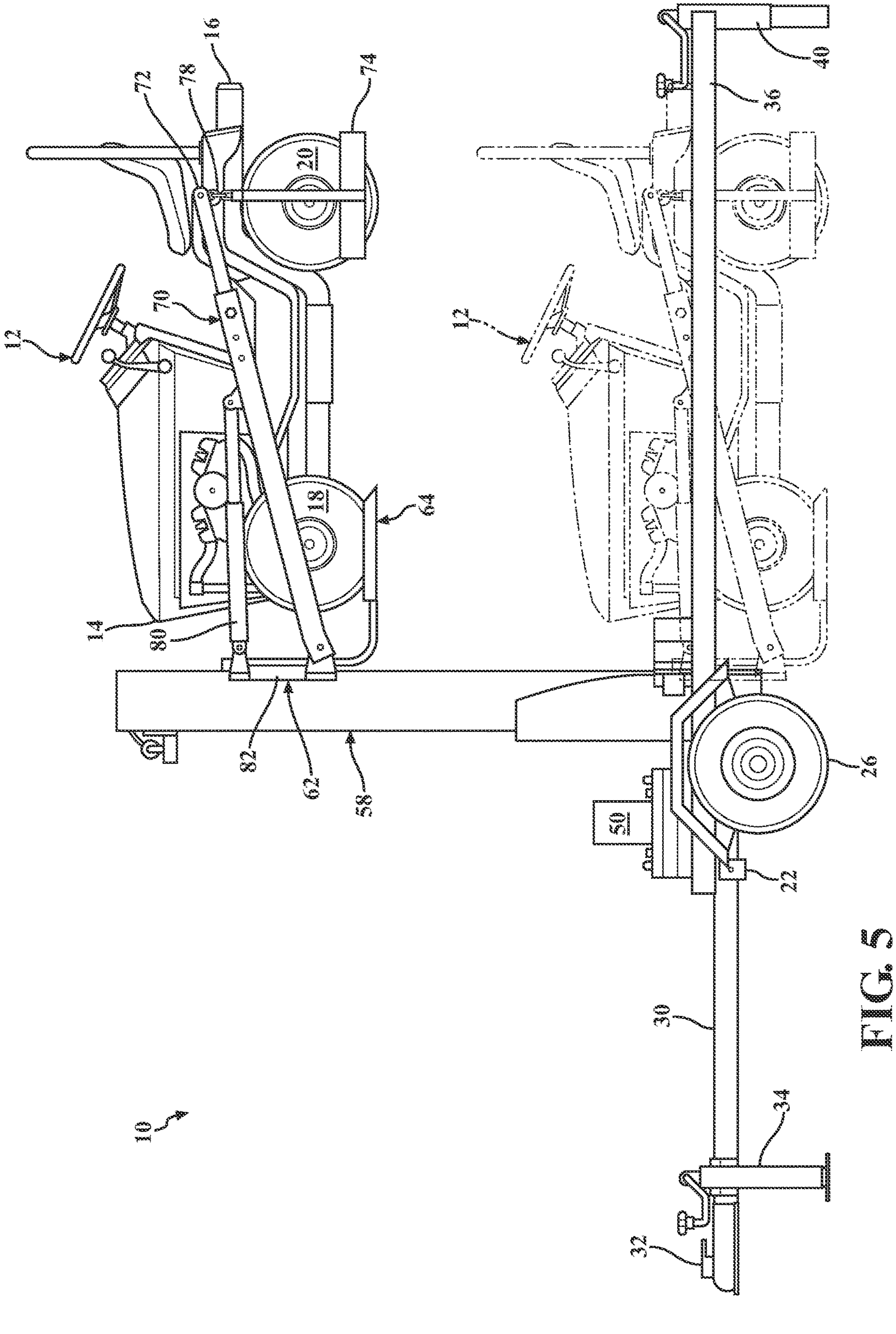
FIG. 5 is a side elevation of the first exemplary embodiment elevating a utility vehicle in a cantilevered condition for repair and maintenance.
Figure 6:
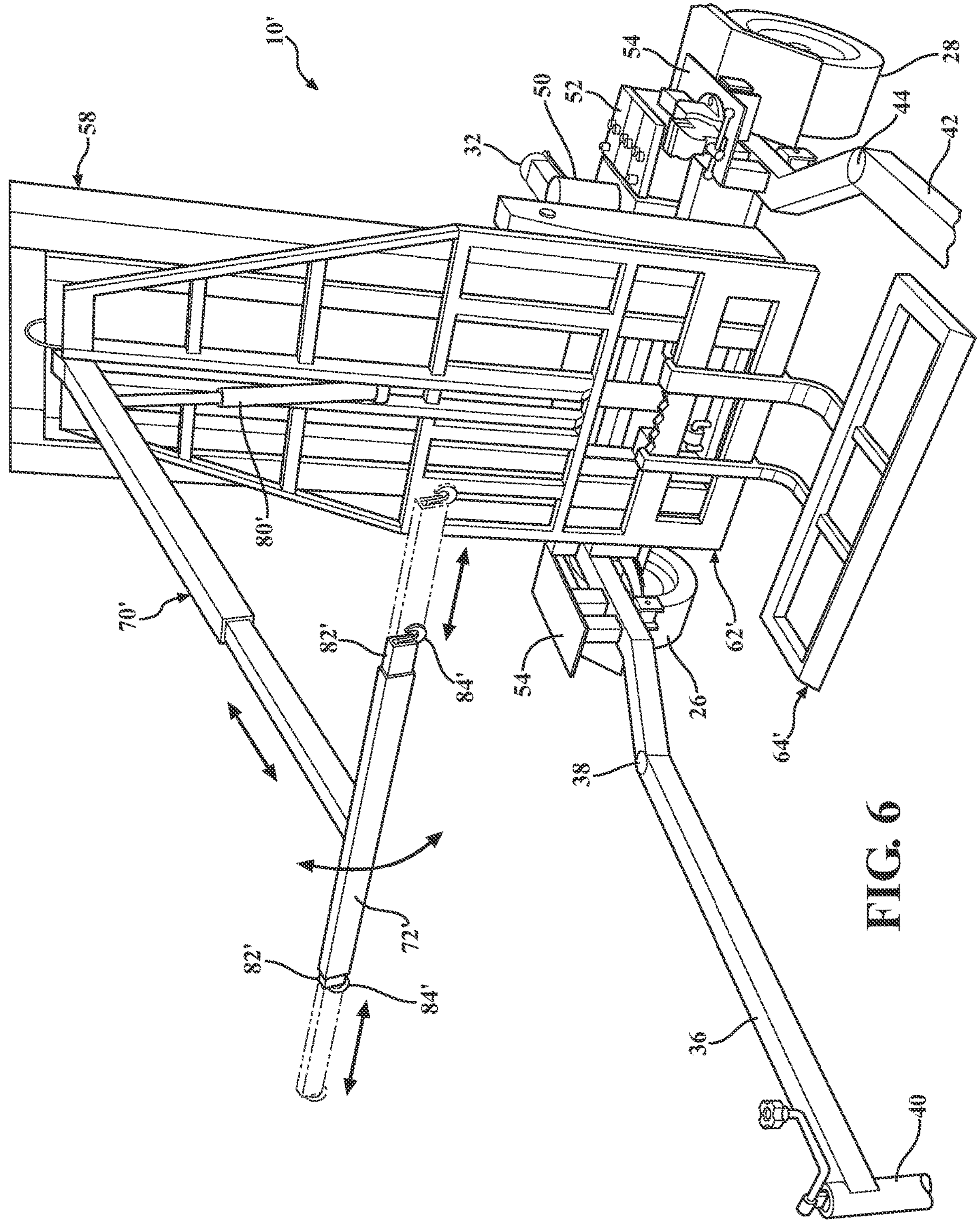
FIG. 6 is a perspective view of the invention according to a second exemplary embodiment.

FIGS. 3-5 are helpful to describe a normal operation of the service lift 10. Turning initially to FIG. 3, the service lift 10 is poised to receive a utility vehicle 12. The carriage 62 is fully lowered so that the chocks 66 of the inboard platform 64 are touching or in close proximity to the ground. Likewise, the wheel cuffs 76 hanging from the respective distal lifting ends 72 are also lowered to close proximity with the ground. The first and second booms 70 are laterally spread apart. The first 36 and second 42 outrigger legs are swung out to their respective deployed positions. Primary leveling jack 34 and both auxiliary leveling jacks 40, 46 are adjusted to securely engage the ground.

FIG. 4 shows the utility vehicle 12 driven or rolled toward the mast 58 until its inboard wheels 18 rest in-between the chocks 66 of the inboard platform 64. If needed, the operator longitudinally adjusts the length of each distal lifting end 72 so that when the booms 70 are rotated into position the wheel cuffs 76 will align with, and engage, the respective outboard wheels 20.

FIG. 5, in side-elevation, showing the utility vehicle 12 elevated to a position for repair/service. For convenience, FIG. 5 depicts the utility vehicle 12 in a more-or-less horizontal attitude. If needed, the distal lifting ends 72 can be vertically adjusted (via boom actuators 80) to change the pitch of the utility vehicle 12 as my be desired by the operator for better access or safety.

Once the service work is complete, the carriage 62 is lowered until the utility vehicle 12 is at rest on the ground. If so fitted, the operator must manually disengage a safety latch to enable the descent. Wheel cuffs 76 are disengaged from the outboard wheels 20 and the booms 70 laterally spread to clear a path for the utility vehicle to move in a longitudinally rearward direction.

In this example, the forward end of the utility vehicle 12 is shown to be the inboard end 16. The configurable nature of the service lift 10 would have easily allowed the utility vehicle 12 to have been backed into the mast 58. A rearward facing lift could be beneficial depending on the type of service to be performed. A particularly advantageous benefit of the service lift 10 is that nearly the entire undercarriage of the utility vehicle 12 is available for service access. Depending on the type of service work to be performed, a rearward facing lift may be preferred.

However, in the second exemplary embodiment of FIGS. 6-9, the carriage 62' is configured so as to utilize a single, centrally located boom 70' having a distal lifting end 72'.

Turning now to FIGS. 6-9, the configurable service lift 10' according to the second exemplary embodiment of the invention will be described. Prime designations are added to previously established reference numbers ascribed with similar functionality. With minor exceptions, the frame 22' and mast 58' features are generally the same as described in connection with FIGS. 1-5. Primary attention will be given to the distinctive components of the carriage 62'.

According to the second exemplary embodiment, the carriage 62' is configured as a single, centrally located boom 70' having a bifurcated distal lifting end 72'. More specifically, the distal lifting end 72' is configured as a laterally oriented T-bar. The lateral adjustor 82' could be configured in at least two different ways. One way is to establish a number a laterally spaced attachment points, such as hooks 84', to the T-bar. The hooks 84' would accommodate the links of a chain to be hung therefrom and used to engage the outboard end 14 of the utility vehicle 12. Another form of lateral adjustor 82' comprises telescopic sections incorporated into each end of the T-bar. This is perhaps best shown in FIG. 6. Hooks 84' carried at the laterally outward ends of the telescopic sections accommodate the links of a chain to be hung therefrom and used to engage the outboard end 14 of the utility vehicle 12. By changing the telescopic positions of the hooks 84', the outboard attachment 74' is laterally shifted relative to the inboard platform 64'.

As previously mentioned, numerous accessory features are contemplated for use with the lift 10, 10'. Among these include an accessory swing arm 86' as shown in highly simplified form in FIG. 9. The accessory swing arm 86' is pivotally supported on one of the outrigger legs 42 to shift back-and-forth on demand to suit the immediate preference of the service technician. In this example, the accessory swing arm 86' is supported from the second outrigger leg 42, and more specifically co-incident with the rotational axis of the second hinge 44. It will be understood that the accessory swing arm 86' could just as easily be supported from the first outrigger leg 36 and need not necessarily be supported co-axially with the rotational axis of either first 38 or second 44 hinge. It should also be understood that while a simple rotation mechanism is envisioned, the accessory swing arm 86' could alternatively be configured to shift back-and-forth with a more complex mechanism design, including but not limited to sliding mounts and four-bar linkages.

A cantilevered bar extends radially from the rotational axis of the accessory swing arm 86', which as mentioned is preferably but by no means necessarily aligned with the rotational axis of the second hinge 44. The cantilever bar is configured to be easily swung in an arcuate path with minimal manual effort. In one contemplated design, a pintle or pin (not shown) drops into a gudgeon-like hole (also not shown) in the second hinge 44 and thus supports the cantilever bar for swinging articulation. The cantilever bar carries adjustable supports 88' designed to engage the underside of a mower deck. The V-shape of the adjustable supports 88' depicted in FIG. 9 is merely suggestive; it is expected the designer of ordinary skill in the art will modify the adjustable supports 88' as needed for the intended applications.

Figure 9:
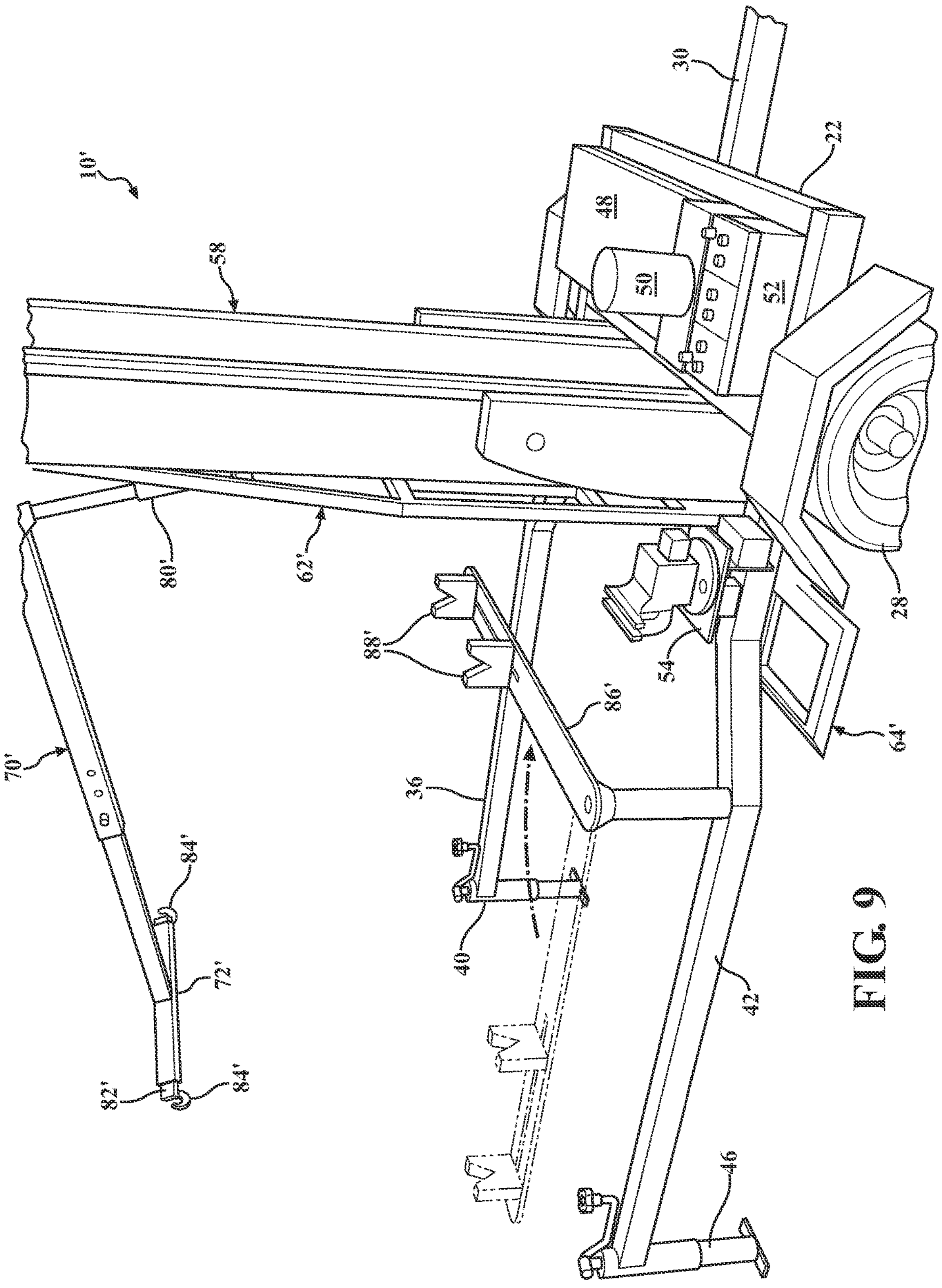
FIG. 9 depicts an optional accessory swing arm having a swinging cantilevered bar configured with adjustable support blocks.

In use, the accessory swing arm 86' may be stationed as shown in phantom FIG. 9. A utility vehicle 12 can be imagined having a mower deck that requires service and/or whose removal is needed to enable access for other required service work on the underside of the utility vehicle 12. With the utility vehicle 12 at a suitable elevated position, the accessory swing arm 86' is swung into the position shown in solid lines in FIG. 9. The supports 88' are adjusted to engage the underside of the mower deck—such as between blades or other suitable spots. The utility vehicle 12 is then lowered until the weight of the mower deck is supported on the accessory swing arm 86'. The technician can now disengage the deck from the utility vehicle 12. Once all connections and belts are removed, the service lift 10' is actuated to elevate the utility vehicle 12 high enough so that its mower deck, now fully supported on the accessory swing arm 86', can be swung out of the way. Re-attachment of the mower deck is conveniently accomplished in reverse order.

Instead of or in addition to the adjustable supports 88', the functional concept of the accessory swing arm 86' can be configured to accommodate other service functions. For example, a pan could be fitted to the cantilever swing arm which is configured to catch oil or fuel or any other type of fluid drained from a lifted utility vehicle 12. When the fluid has been fully drained, the pan can be swung out of the way so the technician may continue service work on the underside of the utility vehicle 12 without fear of accidental spillage. When later re-filling the drained fluid, the pan can be easily returned to serve as a safety catch in case of spillage. In another example, a tray can by supported on the cantilever swing arm, which tray has been configured to bring a curated selection of tools into easy reach of the technical and easily swung out of the way as needed to continue service work on the underside of the utility vehicle 12. Those of skill in the art will readily envision many other optional uses and adaptations for the accessory swing arm 86'.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A configurable service lift for elevating a utility vehicle in a cantilevered condition for repair and maintenance, the utility vehicle having inboard and outboard ends, said configurable service lift comprising:

a frame, a mast supported in said frame and extending vertically from a lower end to an upper end, said mast defining a forward longitudinal direction and a rearward longitudinal direction and a first lateral direction and a second lateral direction, a carriage carried on said mast for travel between said lower and upper ends, said carriage configured to independently support the inboard and said outboard ends of the utility vehicle using at least one inboard platform and at least two booms, said inboard platform attached to said carriage for supporting the inboard end of the utility vehicle, said at least two booms comprising first and second booms, said first and second booms being independently moveable with respect to one another, each said first and second boom extending longitudinally rearwardly to a respective first and second distal lifting end, said first distal lifting end being moveable relative to said carriage and relative to said second distal lifting end in at least two directions, and said second distal lifting end being moveable relative to said carriage and relative to said first distal lifting end in at least two directions.

2. The configurable service lift of claim 1, further including at least one tool pad secured to said frame.

3. The configurable service lift of claim 1, wherein said first distal lifting end is longitudinally extensible relative to said carriage, and said second distal lifting end is longitudinally extensible relative to said carriage.

4. The configurable service lift of claim 1, wherein said first boom is pivotally connected to said carriage for articulating movement in a generally vertical plane between lowered and raised positions, and said second boom is pivotally connected to said carriage for articulating movement in a generally vertical plane between lowered and raised positions.

5. The configurable service lift of claim 4, further including a first boom actuator operatively disposed between said first boom and said carriage, and a second boom actuator operatively disposed between said second boom and said carriage.

6. The configurable service lift of claim 1, further including at least one outboard attachment suspended from said first distal lifting end and at least one outboard attachment suspended from said second distal lifting end, wherein each of said first and second booms includes a lateral adjustor configured to laterally shift the respective said outboard attachment relative to said inboard platform.

7. The configurable service lift of claim 6, wherein said lateral adjustor comprises a hinged attachment of said first boom to said carriage and a corresponding hinged attachment of said second boom to said carriage.

8. The configurable service lift of claim 1, wherein said inboard platform has a hook moveably disposed relative to said carriage for laterally adjusting the position of said inboard platform relative to said carriage.

9. The configurable service lift of claim 1, further including a first outrigger leg rearwardly extendable relative to said frame, and a second outrigger leg rearwardly extendable relative to said frame.

10. The configurable service lift of claim 9, further including an accessory swing arm shiftable back-and-forth on demand relative to one of said first and second outrigger legs.

* * * * *